(12) United States Patent
Hodges et al.

(10) Patent No.: US 7,711,575 B2
(45) Date of Patent: May 4, 2010

(54) METHODS FOR PROVIDING COMMUNICATIONS SERVICES

(75) Inventors: Donna K. Hodges, Cumming, GA (US);
Barrett Morris Kreiner, Norcross, GA (US); Steven N. Tischer, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1141 days.

(21) Appl. No.: 10/720,892

(22) Filed: Nov. 24, 2003

(65) Prior Publication Data

US 2005/0114155 A1 May 26, 2005

(51) Int. Cl.
*G06Q 99/00* (2006.01)
(52) U.S. Cl. .......................... 705/1; 705/400; 455/406; 455/432.1; 455/422.1; 709/223; 379/121.03
(58) Field of Classification Search .................. 705/400, 705/1, 26, 5, 20, 201; 455/433, 405, 432.1, 455/422.1, 406; 709/224, 223, 217; 379/121.03
See application file for complete search history.

(56) References Cited

U.S. PATENT DOCUMENTS

| | | | | |
|---|---|---|---|---|
| 5,752,186 | A | * | 5/1998 | Malackowski et al. ... 455/414.1 |
| 5,771,282 | A | * | 6/1998 | Friedes .................. 379/121.03 |
| 5,790,176 | A | | 8/1998 | Craig |
| 5,862,471 | A | * | 1/1999 | Tiedemann et al. ......... 455/406 |
| 5,970,121 | A | | 10/1999 | Homayoun |
| 5,978,780 | A | | 11/1999 | Watson |
| 6,002,689 | A | | 12/1999 | Christie |
| 6,016,307 | A | | 1/2000 | Kaplan |
| 6,058,301 | A | * | 5/2000 | Daniels ...................... 455/411 |
| 6,104,718 | A | | 8/2000 | Christie |
| 6,178,170 | B1 | | 1/2001 | Duree |
| 6,263,358 | B1 | | 7/2001 | Lee et al. |
| 6,272,343 | B1 | | 8/2001 | Pon et al. |
| 6,285,871 | B1 | * | 9/2001 | Daniels ...................... 455/411 |
| 6,385,198 | B1 | | 5/2002 | Ofek |
| 6,421,714 | B1 | * | 7/2002 | Rai et al. .................... 709/217 |
| 6,456,594 | B1 | | 9/2002 | Kaplan |
| 6,516,194 | B2 | * | 2/2003 | Hanson ..................... 455/433 |
| 6,519,693 | B1 | | 2/2003 | Debey |

(Continued)

FOREIGN PATENT DOCUMENTS

WO    WO 00/41426    7/2000

OTHER PUBLICATIONS

Greene, William, "Sample selection in credit-scoring models", Mar. 31, 1998, Dept of Econ, Stern School of Business, NYU, Elsevier Science, Japan and the World Economy, pp. 299-316.*

(Continued)

*Primary Examiner*—John W Hayes
*Assistant Examiner*—Freda A Nelson
(74) *Attorney, Agent, or Firm*—Scott P. Zimmerman PLLC

(57) ABSTRACT

Methods, systems, and products provide communications services. A request for communications service is received that originates from a client communications device associated with a user. The request for communications service communicates to a service provider of a communications network. The service provider then permits the user to negotiate with other service providers of other communications networks to fulfill the request for communications service.

20 Claims, 16 Drawing Sheets

U.S. PATENT DOCUMENTS

| | | | |
|---|---|---|---|
| 6,522,883 B2 | 2/2003 | Titmuss | |
| 6,535,592 B1 | 3/2003 | Snelgrove | |
| 6,567,375 B2 | 5/2003 | Balachandran | |
| 6,836,652 B2 | 12/2004 | Arima et al. | |
| 6,856,963 B1 | 2/2005 | Hurwitz | |
| 6,917,628 B2 | 7/2005 | McKinnin et al. | |
| 6,934,530 B2* | 8/2005 | Engelhart | 455/406 |
| 7,043,225 B1* | 5/2006 | Patel et al. | 455/405 |
| 7,065,496 B2 | 6/2006 | Subbloie et al. | |
| 7,155,517 B1 | 12/2006 | Koponen | |
| 7,184,548 B2 | 2/2007 | Wee et al. | |
| 7,289,489 B1 | 10/2007 | Kung et al. | |
| 2001/0029544 A1 | 10/2001 | Cousins | |
| 2002/0058532 A1 | 5/2002 | Snelgrove et al. | |
| 2002/0087674 A1* | 7/2002 | Guilford et al. | 709/223 |
| 2002/0112060 A1 | 8/2002 | Kato | |
| 2002/0138418 A1 | 9/2002 | Zarin et al. | |
| 2002/0146102 A1 | 10/2002 | Lang | |
| 2002/0164018 A1 | 11/2002 | Wee | |
| 2002/0176378 A1 | 11/2002 | Hamilton | |
| 2003/0012376 A1 | 1/2003 | Wee | |
| 2003/0043815 A1 | 3/2003 | Tinsley | |
| 2003/0055723 A1 | 3/2003 | English | |
| 2003/0088778 A1 | 5/2003 | Lindqvist | |
| 2003/0093550 A1 | 5/2003 | Lebizay | |
| 2003/0093790 A1 | 5/2003 | Logan et al. | |
| 2003/0100315 A1 | 5/2003 | Rankin | |
| 2003/0126610 A1 | 7/2003 | Ando | |
| 2003/0143978 A1 | 7/2003 | Cooper et al. | |
| 2003/0211856 A1 | 11/2003 | Zilliacus | |
| 2004/0019900 A1 | 1/2004 | Knightbridge et al. | |
| 2004/0132449 A1* | 7/2004 | Kowarsch | 455/432.1 |
| 2004/0139208 A1 | 7/2004 | Tuli | |
| 2004/0249927 A1* | 12/2004 | Pezutti | 709/223 |
| 2005/0038637 A1 | 2/2005 | Balakrishnan | |
| 2005/0094725 A1 | 5/2005 | Hui | |
| 2006/0041679 A1 | 2/2006 | Feig | |
| 2006/0058010 A1 | 3/2006 | Williams et al. | |
| 2007/0112948 A1* | 5/2007 | Uhlik | 709/223 |
| 2007/0203844 A1 | 8/2007 | Kuhn et al. | |
| 2007/0299771 A1 | 12/2007 | Brody et al. | |

OTHER PUBLICATIONS

Greene, William, "Sample Selection in Credit-Scoring Models", Mar. 31, 1998, Dept of Econ, Stern School of Business, NYU, Elsevier Science, Japan and the World Economy, pp. 299-316.*

O'Connell, Brian, "Around the World With Global Network", Oct. 1993, DEC Professionall v121 nl01 p. 38(6).*

Greene, William; "Sample Selection in Credit-Scoring Models", Mar. 31, 1998, pp. 299-316, 18 pgs.

O'Connell, Brian, "Around the World With Global Network", Oct. 1993, DEC Professional, v12, n10, p. 38(6).

* cited by examiner

METHODS FOR PROVIDING COMMUNICATIONS SERVICES

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

CROSS-REFERENCE TO RELATED APPLICATIONS

This application relates to the copending and the commonly assigned U.S. application Ser. No. 10/720,941, entitled "Methods for Providing Communications Services", filed concurrently herewith, and of which the "Brief Summary of the Invention" section and the "Detailed Description of the Invention" section are incorporated herein by reference.

This application relates to the copending and the commonly assigned U.S. application Ser. No. 10/720,949, entitled "Methods for Providing Communications Services", flied concurrently herewith, and of which the "Brief Summary of the Invention" section and the "Detailed Description of the Invention" section are incorporated herein by reference.

This application relates to the copending and the commonly assigned U.S. application Ser. No. 10/720,586, entitled "Methods for Providing Communications Services", filed concurrently herewith, and of which the "Brief Summary of the Invention" section and the "Detailed Description of the Invention" section are incorporated herein by reference.

This application relates to the copending and the commonly assigned U.S. application Ser. No. 10/720,800, entitled "Methods for Providing Communications Services", filed concurrently herewith, and of which the "Brief Summary of the Invention" section and the "Detailed Description of the Invention" section are incorporated herein by reference.

This application relates to the copending and the commonly assigned U.S. application Ser. No. 10/720,780, entitled "Methods for Providing Communications Services", filed concurrently herewith, and of which the "Brief Summary of the Invention" section and the "Detailed Description of the Invention" section are incorporated herein by reference.

This application relates to the copending and the commonly assigned U.S. application Ser. No. 10/720,956, entitled "Methods for Providing Communications Services", filed concurrently herewith, and of which the "Brief Summary of the Invention" section and the "Detailed Description of the Invention" section are incorporated herein by reference.

This application relates to the copending and the commonly assigned U.S. application Ser. No. 10/720,946, entitled "Methods for Providing Communications Services", filed concurrently herewith, and of which the "Brief Summary of the Invention" section and the "Detailed Description of the Invention" section are incorporated herein by reference.

This application relates to the copending and the commonly assigned U.S. application Ser. No. 10/720,587, entitled "Methods for Providing Communications Services", filed concurrently herewith, and of which the "Brief Summary of the Invention" section and the "Detailed Description of the Invention" section are incorporated herein by reference.

BACKGROUND OF THE INVENTION

1. Field of the Invention

This invention generally relates to computers and to communications and, more particularly, to processing data in a communications network.

2. Description of the Related Art

Manipulation of electronic data is important in computer networking and in communications. Often times electronic data must be manipulated for presentation at a client communications device. That is, the electronic data must be changed, formatted, or altered to suit the display characteristics, processing abilities, and/or storage capabilities of the client communications device. A handheld personal data assistant, for example, often requires that bandwidth-intensive electronic data, such as on-demand video, be scaled, color corrected, and/or otherwise manipulated for optimum presentation on the small display of the handheld personal data assistant. Heretofore, however, manipulation of electronic data was usually the responsibility of the client communications device—that is, the client communications device stores and utilizes one or more computer programs to manipulate incoming electronic data for presentation on the client communications device.

Locally manipulating electronic data, however, poses problems. As the electronic data is received, the client communications device must store the electronic data, process/manipulate the electronic data, and present the manipulated electronic data to the user. This process of storing, manipulating, and/or presenting the electronic data, however, often taxes the limited processing and storage capabilities of the client communications device. As both those skilled and unskilled recognize, when the processing and/or storage capabilities of the client communications device are overwhelmed, the audio/video presentation may "stumble" and degrade the user experience. Sometimes the client communications device even experiences a fault or failure when the processing and/or storage capabilities are overwhelmed. There is, accordingly, a need in the art for methods and systems of manipulating electronic data that reduce the need for locally-stored computer programs and that reduce the need for local processing requirements.

BRIEF SUMMARY OF THE INVENTION

The aforementioned problems, and other problems, are reduced by a Analysis Module. This Analysis Module comprises methods, computer systems, computer programs, and computer program products that provide communications services. The Analysis Module extends trust-based credit in sometimes-connected scenarios using linear prediction to facilitate data segmentation, translation, and aggregation transactions. When a user of a client communications device has a history of trust (e.g., consistent payment for communications services), the user may then obtain future communications services without immediate payment. Because the user is "trusted," a service provider may have freedom and time to aggregate billing between, and/or for, various multiple network operators. Because the user is "trusted," the service provider could allocate, or award, extra bandwidth as the user needs, possibly from a secondary or tertiary-available network, even though the billing interactions are not immediately pursuable. This invention is especially useful for sometimes-connected solutions, and even more dynamic solutions, because this invention allows the value to be transferred as soon as possible without awaiting billing interactions.

This invention discloses methods, systems, and products for providing communications services. One of the embodiments describes a method for providing communications services. This method receives a request for communications service. The request for communications service originates from a client communications device associated with a user, and the request for communications service communicates via a communications network to a service provider of that communications network. The service provider then permits the user to negotiate with other service providers of other communications networks to fulfill the request for communications service.

Other embodiments of this invention describe a system for providing communications services. The system includes a Analysis Module stored in a memory device, and a processor communicates with the memory device. The Analysis Module receives a request for communications service. The request for communications service originates from a client communications device associated with a user, and the request for communications service communicates via a communications network to a service provider of that communications network. The Analysis Module then permits the user to negotiate with other service providers of other communications networks to fulfill the request for communications service.

Other embodiments of this invention describe a computer program product. A computer-readable medium stores a Analysis Module. The Analysis Module receives a request for communications service. The request for communications service originates from a client communications device associated with a user, and the request for communications service communicates via a communications network to a service provider of that communications network. The Analysis Module then permits the user to negotiate with other service providers of other communications networks to fulfill the request for communications service.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE SEVERAL VIEWS OF THE DRAWINGS

These and other features, aspects, and advantages of the embodiments of the present invention are better understood when the following Detailed Description of the Invention is read with reference to the accompanying drawings, wherein.

DETAILED DESCRIPTION OF THE INVENTION

This invention now will be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

Figure 1:
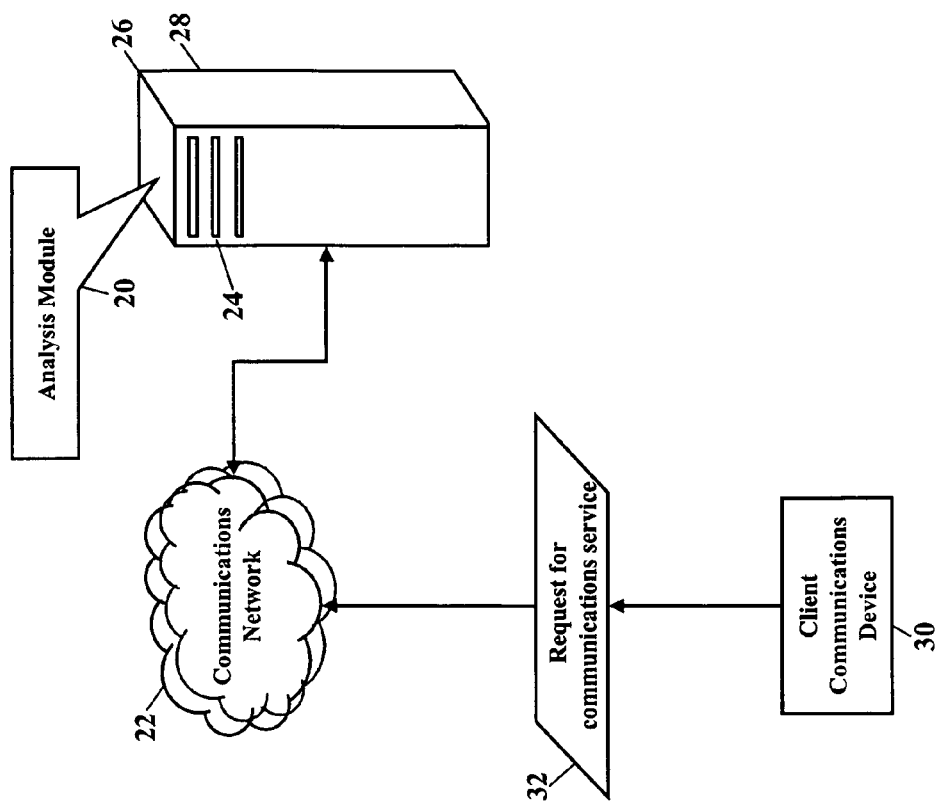
FIG. 1 is a schematic illustrating a Analysis Module operating within a communications network, according to one of the embodiments of this invention.

FIG. 1 is a schematic illustrating one of the embodiments of this invention. FIG. 1 shows a Analysis Module 20 operating within a communications network 22. This communications network 22 represents just one of the possible operating environments for the Analysis Module 20. The Analysis Module 20 is stored within memory 24 of a computer device 26, such as a service provider's computer server 28 communicating with the communications network 22. Each time a client communications device 30 requires communications service, the Analysis Module 20 receives a request 32 for communications service from the client communications device 30. The request 32 for communications service requests communications service via the communications network 22.

The client communications device 30 sends and receives data. When the client communications device 30 requires communications service, the term "communications service" means the client communications device 30 requests a data upload and/or a data download via a communications network. The term "data" includes electronic information, such as, for example, facsimile, electronic mail (e-mail), text, video, audio, and/or voice in a variety of formats, such as dual tone multi-frequency, digital, analog, and/or others. Additionally, the data may include: (1) executable programs, such as a software application, (2) an address, location, and/or other identifier of the storage location for the data, (3) integrated or otherwise combined files, and/or (4) profiles associated with configuration, authenticity, security, and others. The client communications device 30 may include any computer/communications device utilizing a microprocessor and/or a digital signal processor. The client communications device 30 may include, for example, a computer (laptop, desktop, tablet, server, and other computer systems), a personal digital assistant (PDA), a Global Positioning System (GPS) device, an interactive television, an Internet Protocol (IP) phone, a pager, and/or a cellular/satellite phone.

The Analysis Module 20 receives the request 32 for communications service. The client communications device 30 communicates the request 32 for communications service to the computer server 28, and thus the Analysis Module 20, via the communications network 22. Because the client communications device 30 is associated with a user, the Analysis Module 20 determines whether the user is permitted to negotiate with other service providers to fulfill the request 32 for communications service. That is, the Analysis Module 20 determines whether the user can be trusted to pay the service provider for arranging the requested communications service, even though another, different service provider may actually provide the requested communications service.

Figure 2:
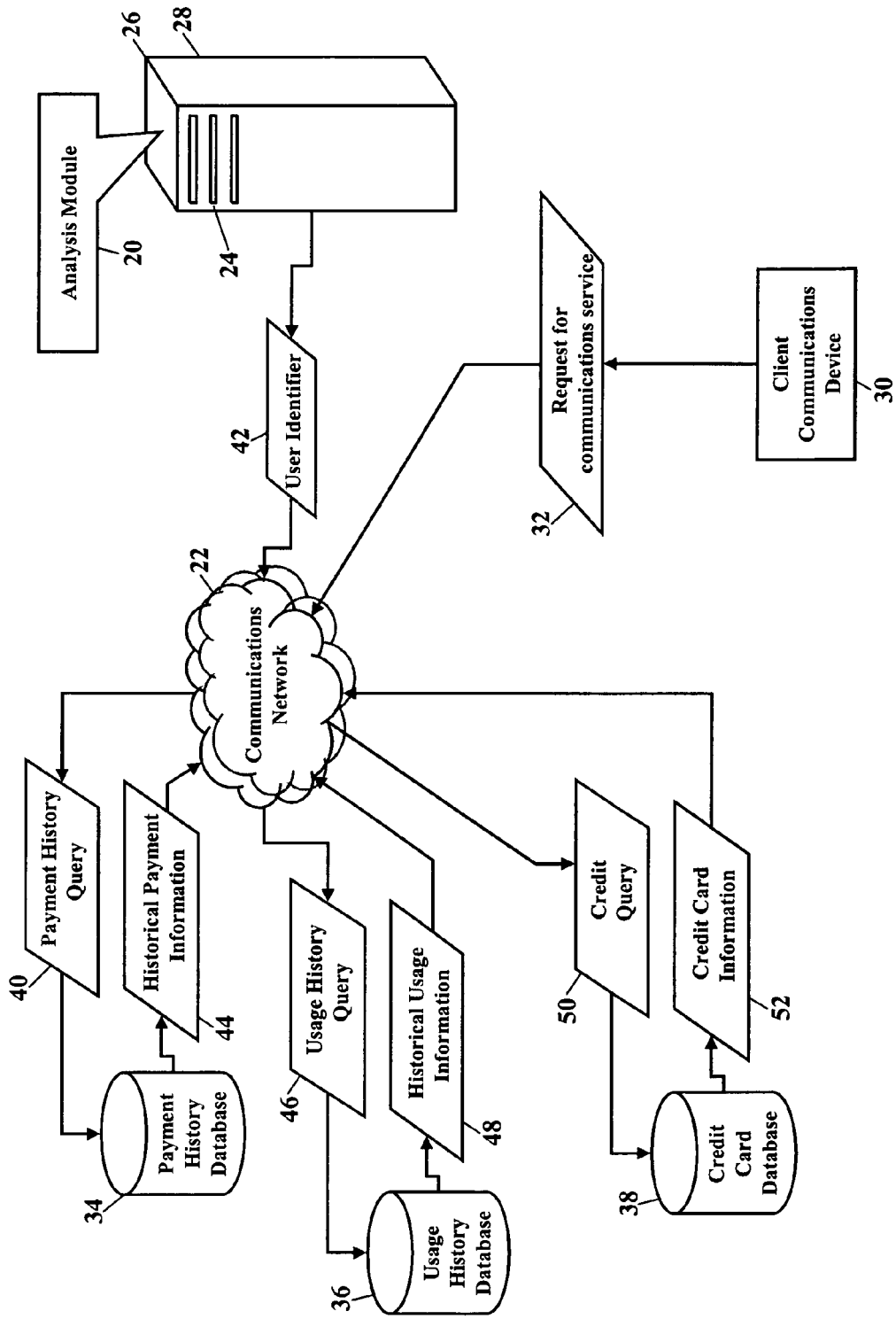
FIG. 2 is a schematic illustrating the Analysis Module evaluating a user's credit risk, according to more embodiments of this invention.

FIG. 2 is a schematic illustrating an evaluation of the user's credit position. When the Analysis Module 20 receives the request 32 for communications service, the Analysis Module 20 determines whether to extend trust-based credit to the user associated with the client communications device 30. The term "trust-based" credit means the user can be trusted to pay for communications services, even though billing relationships may not be established between differing service providers, differing communications networks, and/or new routing configurations. Because these billing relationships are not established, the user is receiving communications services even though costs and terms may not be known. Because the user is "trusted," however, a service provider may have freedom and time to establish the necessary billing relationships and to aggregate the total billing charges between the differing service providers, the differing communications networks, and/or the new routing configurations. Once the aggregated total billing charges are known, the user is then billed. The term "trust-based" credit, therefore, means that the user is trusted to pay for communications services, even though the user cannot be immediately told/informed of the total bill.

As FIG. 2 shows, the Analysis Module 20 evaluates the user's credit risk by querying various databases. The Analysis Module 20 may query a payment history database 34, a usage history database 36, and a credit card database 38. The payment history database 34 stores/maintains information relating to the user's history of payments to creditors. The usage history database 36 stores/maintains information relating to the user's past usage of communications services. The credit card database 38 stores/maintains information relating to a line of credit with a credit card issuer. The Analysis Module 20 then uses this information to decide whether to extend trust-based credit to the user associated with the client communications device 30.

The payment history database 34 stores/maintains information relating to the user's history of payments to creditors. These creditors may include one or more communications service providers, other utility providers (e.g., water, electric, gas, cable), banks, credit unions, department stores, lending institutions, and any other entity extending credit to the user. The user's history of payments to creditors could include past payments made to a creditor, the date of those past payments, late fees, penalties, collection efforts, credit scores, credit rankings, and any other information that helps determine whether the user reliably pays charges. The Analysis Module 20 sends a payment history query 40 to a computer device storing/maintaining the payment history database 34. The payment history query 40 includes a user identifier 42. The user identifier 42 identifies the user and allows the user's payment history to be located in the payment history database 34. The user identifier 42 may include an account number, a credit card number, a user ID, a social security number, a drivers license number, an employee number, a personal identification number (PIN), and/or or any other information that helps locate the user's payment history. When the payment history query 40 is received, the payment history database 34 is accessed, the user's historical payment information 44 is retrieved, and the user's historical payment information 44 is returned communicated to the Analysis Module 20 via the communications network 22.

The usage history database 36 stores/maintains information relating to the user's past usage of communications services. If the service provider extends trust-based credit to the user, then the user may be permitted to negotiate with other service providers to fulfill the request 32 for communications service. When the Analysis Module 20 evaluates the user's credit risk, the service provider may weigh the user's transactional/daily/monthly/yearly usage of communications services. The service provider, for example, may reserve the ability to negotiate for those users who require a large amount of bandwidth on a single, transactional basis. The user, in other words, requires a high bandwidth to fulfill the request 32 for communications service, and the user thus qualifies to negotiate for price/performance/quality. The service provider additionally or alternatively may reserve the ability to negotiate for those users who utilize hundreds, perhaps thousands, of minutes per month of communications services. If, for example, a user routinely requires 5000 minutes per month of communications services, the service provider might strive to continually satisfy the user. If, conversely, the user only sporadically requires communications services, then the administrative costs of negotiating between several service providers might outweigh any profit potential.

FIG. 2, then, shows a usage history query 46. The Analysis Module 20 sends the usage history query 46 to a computer device storing/maintaining the usage history database 36. The usage history query 46 includes the user identifier 42. When the usage history query 46 is received, the usage history database 36 is accessed, the user's historical usage information 48 is retrieved, and the user's historical usage information 48 is return communicated to the Analysis Module 20 via the communications network 22. The Analysis Module 20 then uses the user's historical usage information 48 to decide whether to extend trust-based credit to the user associated with the client communications device 30.

The Analysis Module 20 may also query the credit card database 38. The credit card database 38 stores/maintains information relating to a line of credit with a credit card issuer. Although the user may receive an actual billing statement for fulfilling the request 32 for communications services, an alternative billing method would be a credit card transaction. The user's credit card, in other words, is billed for the communications service. Although the billing relationships may not be immediately known, because the user is "trusted," the service provider can establish the necessary billing relationships and can aggregate the total billing charges between the differing service providers, the differing communications networks, and/or the new routing configurations. Once the billing is known, the user's credit card is then billed for the communications service. The Analysis Module 20, then, queries the credit card database 38 to help determine whether the user has a sufficient line of credit. The Analysis Module 20 sends a credit query 50 to a computer device storing/maintaining the credit card database 38. The credit query 50 includes the user identifier 42 (such as a credit card number associated with the user, an expiration date, and/or an authorization number). When the computer device receives the credit query 50, the computer device accesses the credit card database 38, retrieves the user's credit card information 52, and then return communicates the user's credit card information 52 to the Analysis Module 20 via the communications network 22. The Analysis Module 20 then uses the user's credit card information 52 to decide whether to extend trust-based credit to the user associated with the client communications device 30.

FIGS. 3-6 are schematics illustrating a negotiations process. Once the Analysis Module 20 receives the user's historical payment information 44, the user's historical usage information 48, and the user's credit card information 52, the Analysis Module 20 then decides whether the user is permitted to negotiate with other service providers. The Analysis Module 20 typically uses an algorithm in which the user's historical payment information 44, the user's historical usage information 48, and the user's credit card information 52 are variables. Each variable may have weighting factors to emphasize or de-emphasize any component. Most simple, however, is a linear prediction algorithm in which trust-based credit is extended when the user's communications account is up-to-date. That is, if the user's communications account is timely paid-in-full for the last month, then the Analysis Module 20 linearly predicts that the user will similarly pay on-time and in-full next month. This linear prediction algorithm may also be applied to individual transactions, daily accounts, or any other billing payment interval. If, for example, the user timely paid-in-full for the last transaction (e.g. the previous upload/download communications service), then the Analysis Module 20 linearly predicts that the user will similarly pay on-time and in-full for the next transaction. If the user timely paid-in-full for the previous day's communications services, then the Analysis Module 20 linearly predicts that the user will similarly pay on-time and in-full for the current day's communications services. This method of linearly predicting trust-based credit is especially useful when the user's bank account is drafted for communications services, or if the user's credit card is processed for communications services. Whatever this algorithm may be, the Analysis Module 20 decides whether the user is permitted to negotiate with other service providers for communications services.

Figure 3:
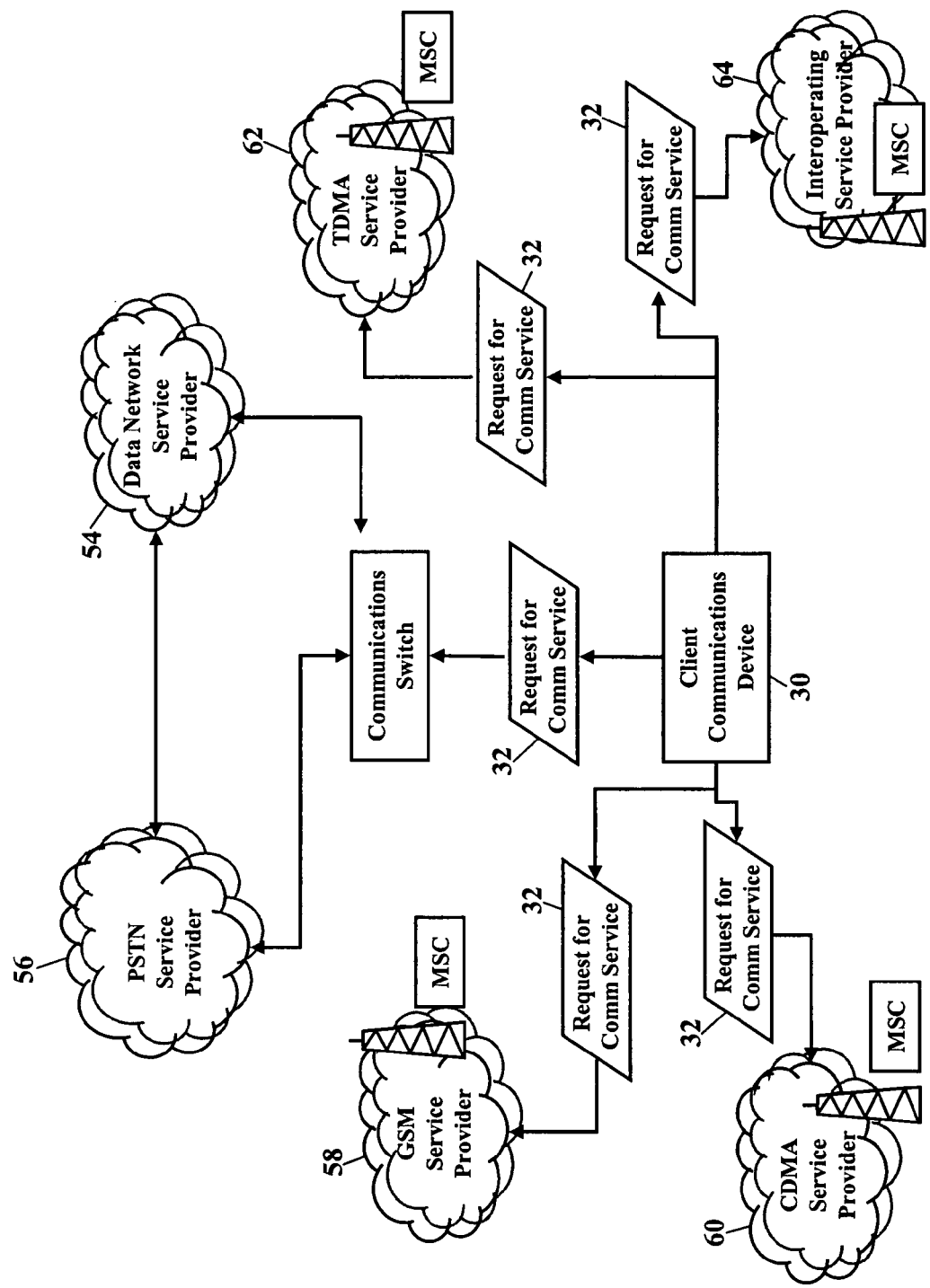
FIGS. 3-6 are schematics illustrating a negotiations process, according to still more embodiments of this invention.
Figure 4:
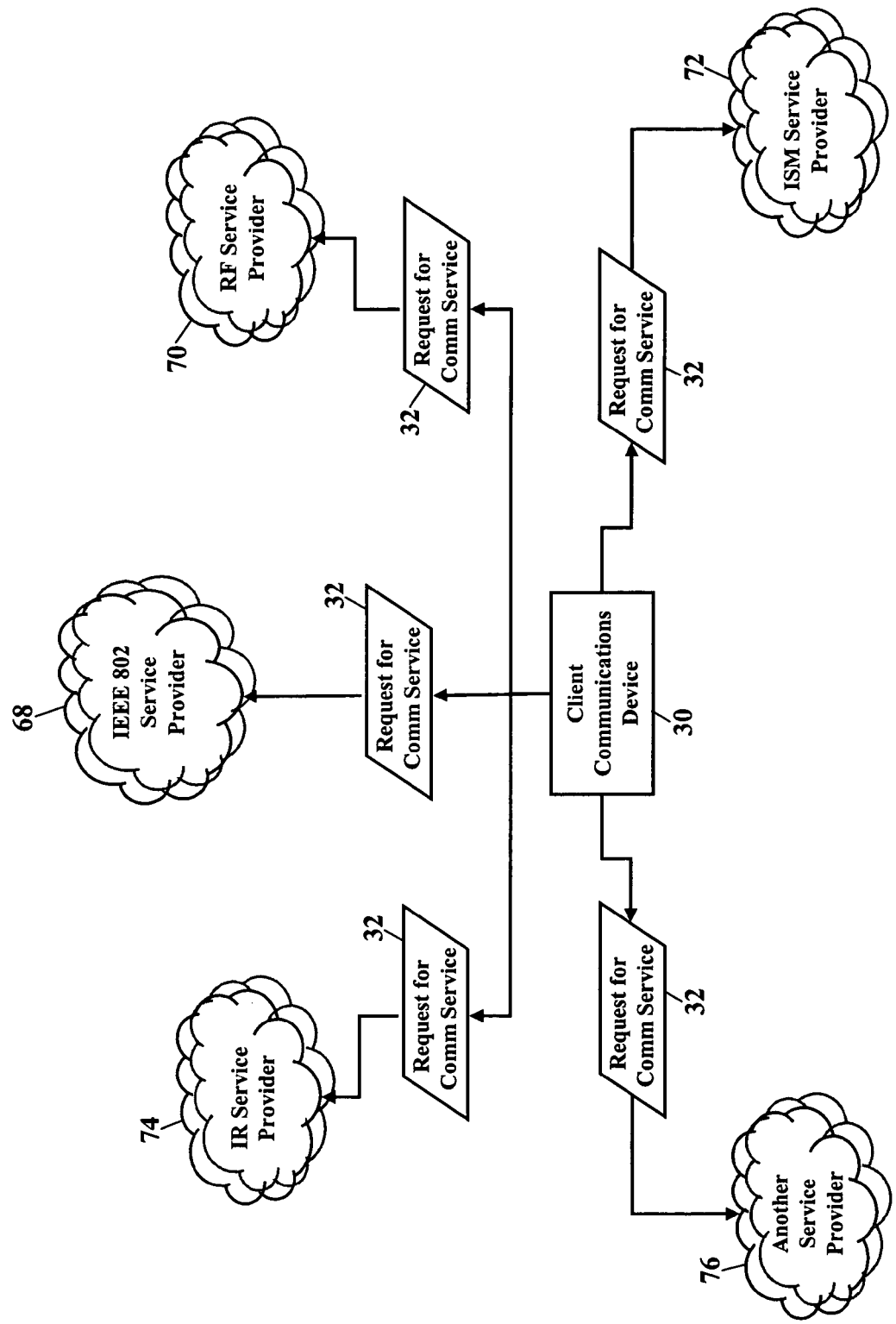

If trust-based credit is extended, the user is permitted to negotiate with other service providers. The user, using the client communications device 30, may communicate the request 32 for communications service to other service providers and/or to other communications networks. As FIGS. 3 and 4 illustrate, multiple communications networks may be invited to bid to fulfill the request 32 for communications service. The user, for example, might communicate the request 32 for communications service to a data network 54, a Public Switched Telephone Network 56, a GSM cellular network 58, a CDMA cellular network 60, a TDMA cellular network 62, and a GSM/CDMA/TDMA interoperating network 64. As those of ordinary skill in the art recognize, the GSM cellular network 58 operates using the Global System for Mobile (GSM) communications technology standard, the CDMA cellular network 60 operates using a Code Division Multiple Access (CDMA) communications technology standard, and the TDMA cellular network 62 operates using a Time Division Multiple Access (TDMA) communications technology standard. Those of ordinary skill in the art also recognize that the GSM/CDMA/TDMA interoperating network 64 may operate using a GSM-ANSI Interoperability Team (GAIT) communications technology standard, a combination CDMA/GSM technology standard, and/or a combination TDMA/CDMA technology standard.

As FIG. 4 shows, the multiple networks may also include an I.E.E.E. 802 wireless network 68, an RF wireless network 70, an ISM wireless network 72, an IR wireless network 74, and another wireless network 76 using another portion of the electromagnetic spectrum. The I.E.E.E. 802 wireless network 68 utilizes any of the I.E.E.E 802 family of wireless technology standards to wirelessly communicate with the client communications device 30. The client communications device 30 may also have access to the RF wireless network 70 using the radio frequency (RF) portion of the electromagnetic spectrum. The client communications device 30 may also discover an ISM wireless network 72. The ISM wireless network 72 utilizes the Industrial, Scientific, and Medical (ISM) band of the electromagnetic spectrum to wirelessly communicate with the client communications device 30. One example of the ISM wireless network 72 would be a BLUETOOTH® network. The client communications device 30 may also discover an IR wireless network 74, and the IR wireless network 74 uses the infrared (IR) portion of the electromagnetic spectrum to provide wireless communication. The client communications device 30 may also have access to another wireless network 76, and the another wireless network 76 utilizes any other portion/frequency within the electromagnetic spectrum to wirelessly communicate with the client communications device 30.

Figure 5:
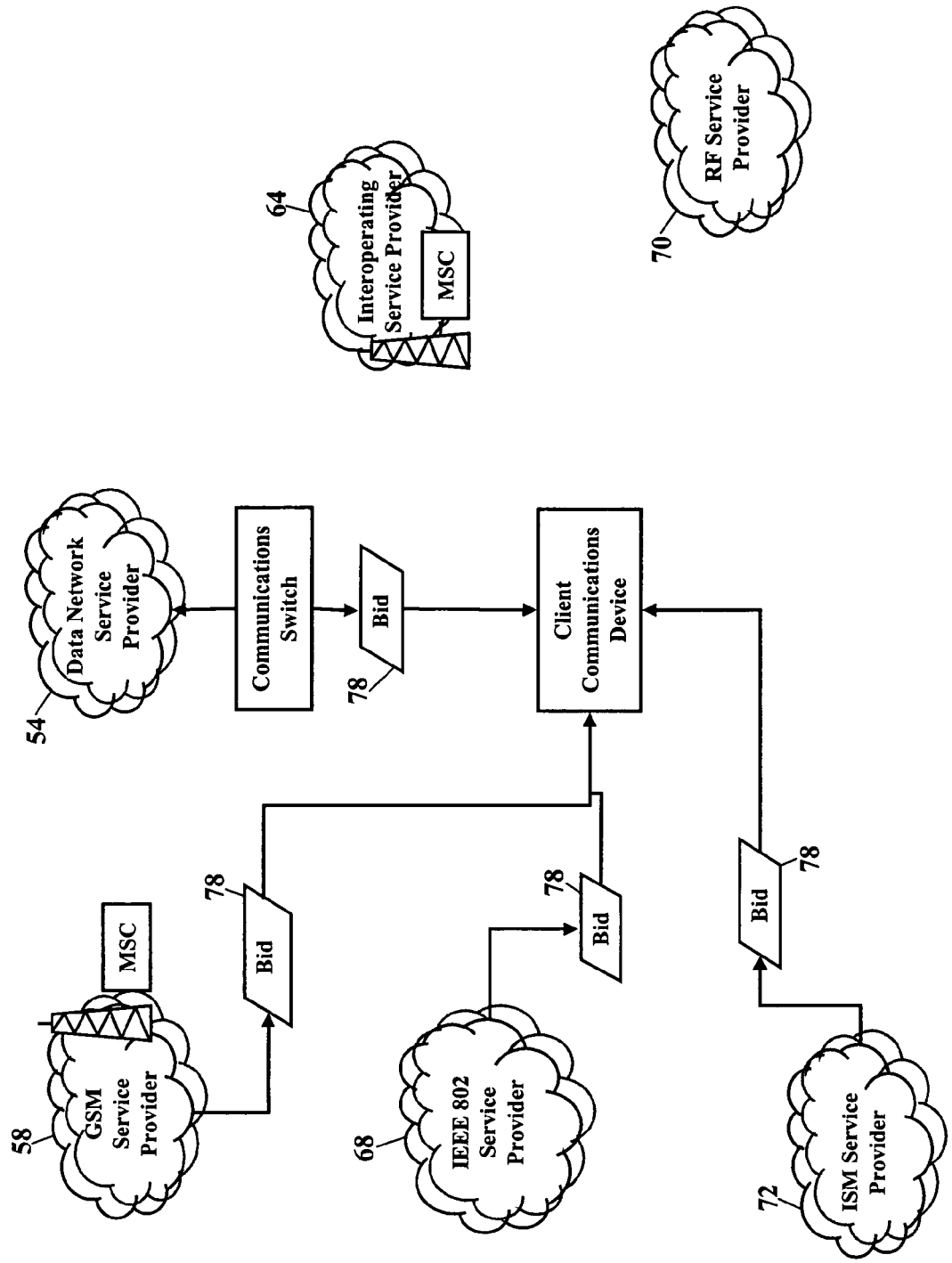
Figure 6:
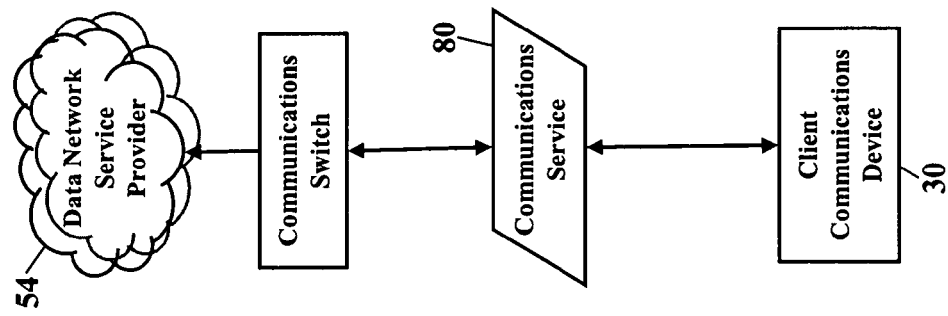

FIGS. 5 & 6 are schematics illustrating a bidding process. When each service provider of each communications network receives the request 32 for communications service, each service provider decides to whether to bid. Each service provider analyzes the request 32 for communications service and determines if the service provider wishes to bid. If a service provider wishes to bid, the service provider return communicates a bid 78. FIG. 5 shows the client communications device 30 receiving/gathering each submitted bid 78. Internal software, operating within the client communications device 30, evaluates each bid 78 and determines which single bid is preferred or which combination of bids is preferred. That is, multiple communications networks may be required to fulfill the request 32 for communications service, such as a series combination of a wireless communications network, the Public Switched Telephone Network (shown as reference numeral 56 in FIG. 3), and the data network 54. FIG. 6 illustrates that when a winning bid is selected, the winning bidder(s) provides/provide the requested communications services 80. FIG. 6, for simplicity, shows only the data network 54 as the winning bidder, however, those of ordinary skill in the art will now understand that a combination of differing communications networks may have won the bidding process.

Figure 7:
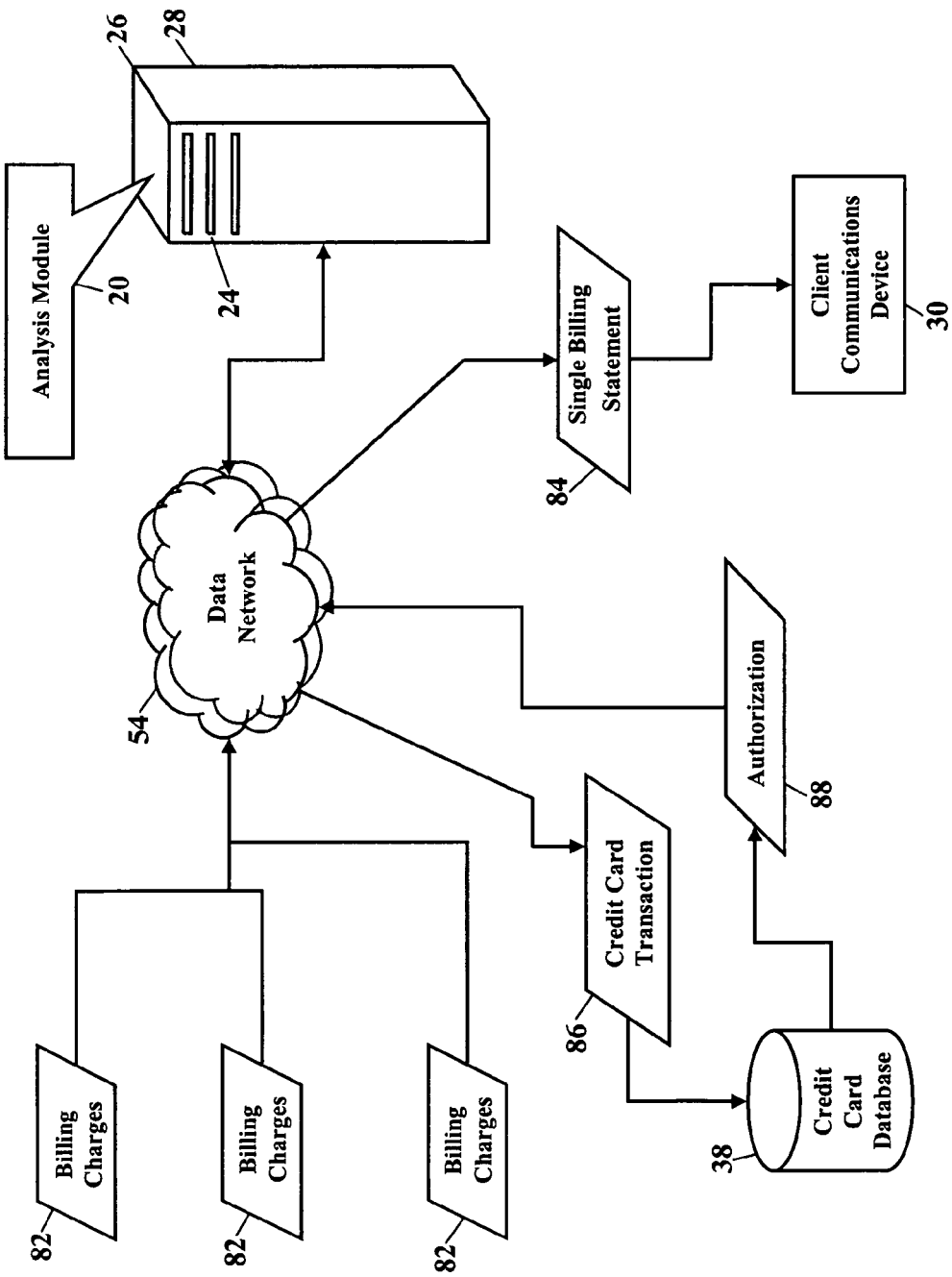
FIG. 7 is a schematic illustrating a billing process, according to one of the embodiments of this invention.

FIG. 7 is a schematic illustrating a billing process. Because trust-based credit was extended to the user associated with the client communications device 30, the user is trusted to pay for the communications services (shown as reference numeral 80 in FIG. 6). Although billing relationships may not be established between differing service providers, differing communications networks, and/or new routing configurations, the user is receiving the communications services even though costs and terms may not be known. Because the user is "trusted," however, a service provider may have freedom and time to establish the necessary billing relationships and to aggregate the total billing charges between the multiple communications networks of the differing service providers, the differing communications networks, and/or the new routing configurations.

FIG. 7, then, illustrates one service provider (e.g., the service provider of the data network 54) aggregating billing charges 82 from other service providers of other communications networks. Whatever combination of differing communications networks may have won the bidding process, the Analysis Module 20 of this invention aggregates the individual billing charges 82 from the individual service providers of the individual communications networks. Once the individual billing charges 82 are aggregated, a single billing statement 84 is presented to the user. This single billing statement 84 is communicated from a single service provider, and the single billing statement 84 aggregates the individual billing charges 82 between the other service providers of the other communications network. That is, even though multiple communications networks may be required to fulfill the request 32 for communications service, and thus multiple service providers must submit the billing charges 82, a single service provider presents the single billing statement 84 to the user. The Analysis Module 20, then, allows a single service provider to act as a "tier 1" provider of communications services and, yet, utilize "tier 2" network operators to provide communications services.

FIG. 7 also illustrates a credit card transaction 86. Once the individual billing charges 82 are aggregated, the Analysis Module 20 may have authorization to process the user's credit card as payment for the communications services (shown as reference numeral 80 in FIG. 6). The Analysis Module 20, then, may also communicate the credit card transaction 86 to the credit card database 38. If the user's credit card account accepts the credit card transaction 86 (that is, the user's credit card has sufficient available balance), an authorization 88 is return communicated credit to the Analysis Module 20. If, however, the credit card transaction 86 is denied, the credit card database 38 would be updated with an indication of the denial (not shown for simplicity), and the user may not be able to receive future communications services until the billing is settled.

FIGS. 8-12 are schematics illustrating an alternative bidding process. FIGS. 3-5 illustrated one of the client communications device-oriented embodiments of this invention. That is, if the user is extended trust-based credit, then the client communications device 30 communicated with other service providers to negotiate for communications service. FIGS. 8-12, however, show a Analysis Module 20-oriented version of the embodiments of this invention. If the user is extended trust-based credit, here the Analysis Module 20 negotiates on behalf of the user.

Figure 8:
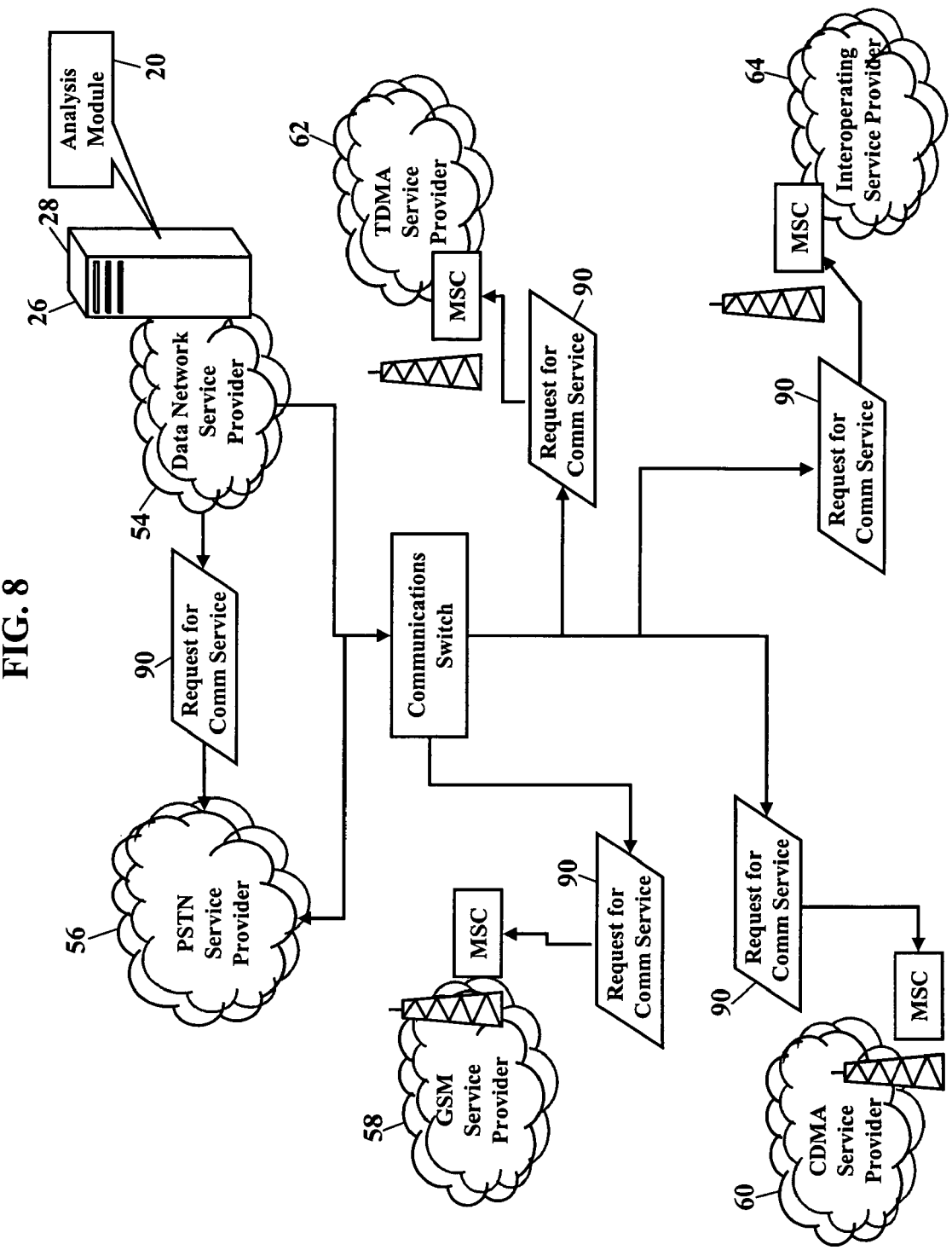
FIGS. 8-12 are schematics illustrating an alternative bidding process, according to another of the embodiments of this invention.
Figure 9:
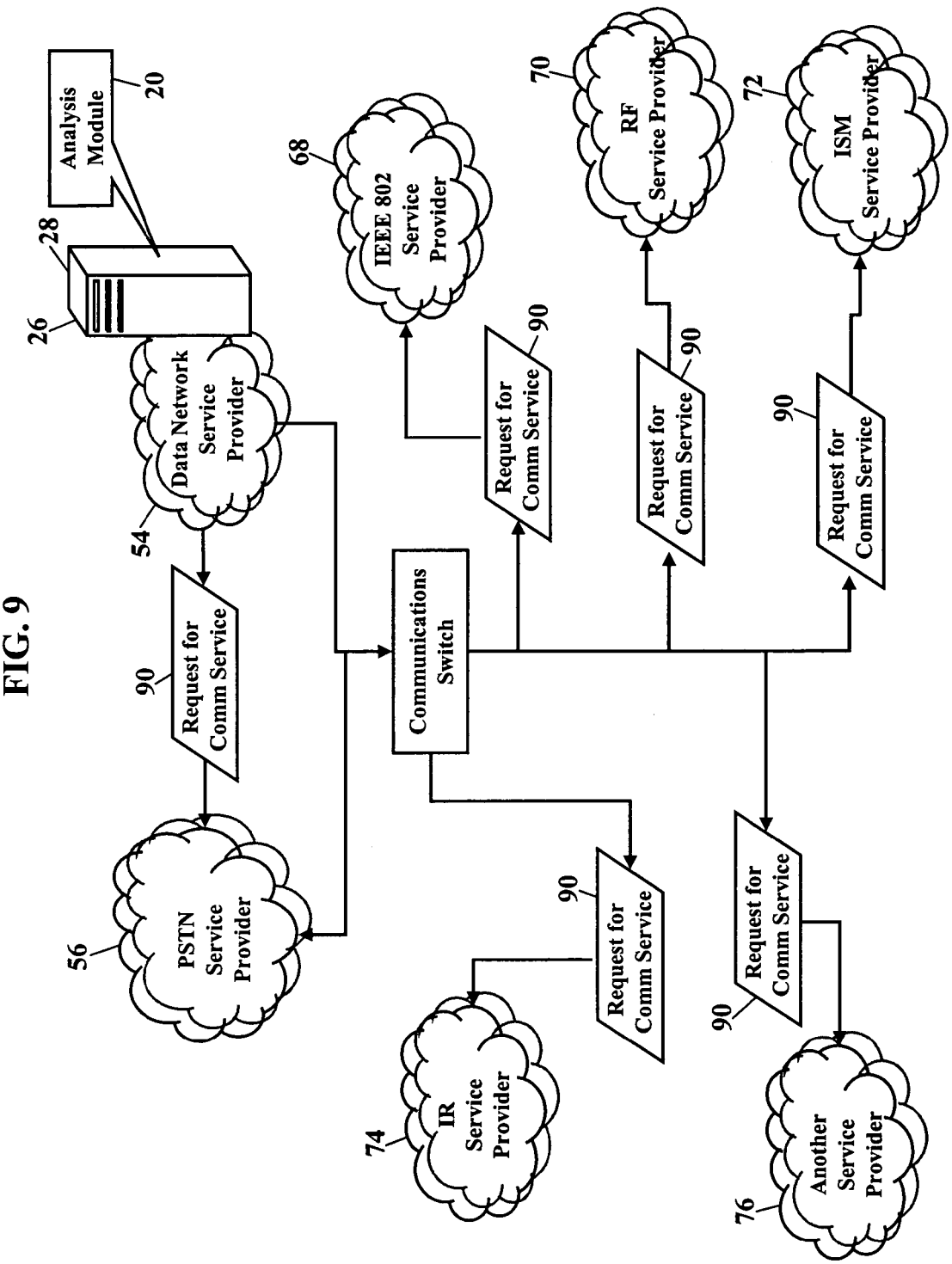
Figure 10:
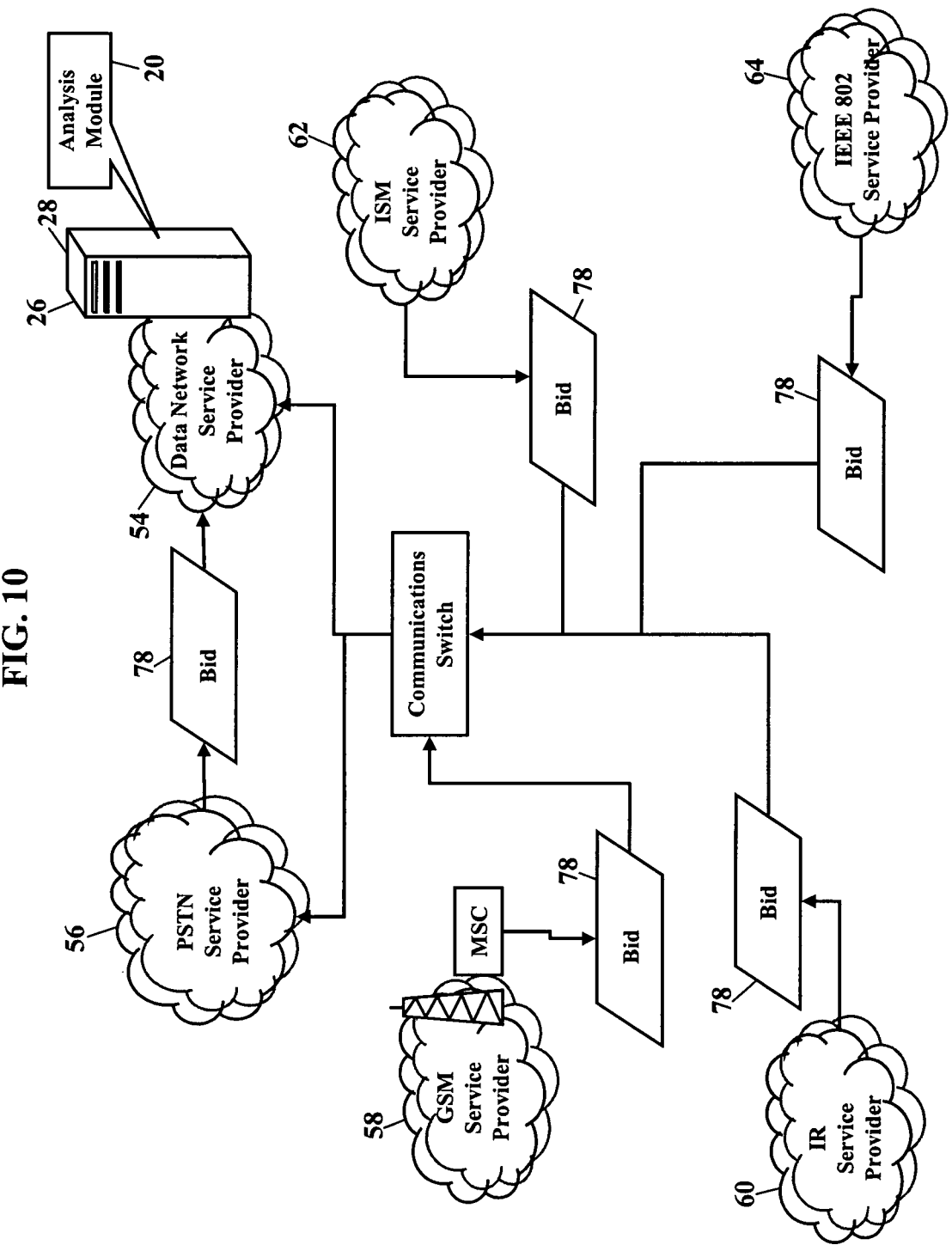

Before FIGS. 8-12 are explained in detail, the reader is invited to recap the preliminary processes. As FIG. 1 showed, each time the client communications device 30 required communications service, the Analysis Module 20 received the request 32 for communications service from the client communications device 30. The request 32 for communications service requests communications service via the communications network 22. The communications network 22 is a generic term referring to any other multiple communications networks shown in FIGS. 3 and 4. The Analysis Module 20 receives the request 32 for communications service, and the Analysis Module 20 determines whether to extend trust-based credit to the user associated with the client communications device 30. As FIG. 2 showed, the Analysis Module 20 evaluates the user's credit risk by querying the payment history database 34, the usage history database 36, and the credit card database 38. The Analysis Module 20 then uses these queries to decide whether to extend trust-based credit to the user associated with the client communications device 30. If the user qualifies for trust-based credit, FIGS. 8-10 show the Analysis Module 20 negotiating on behalf of the user, as a service for the user.

As FIGS. 8 and 9 show, the Analysis Module 20 negotiates on behalf of the user. Because the user qualifies for trust-based credit, the Analysis Module 20 communicates a request 90 for communications service to other service providers and/or to other communications networks. Because the user qualifies for trust-based credit, the Analysis Module 20 invites other service providers, of other competing communications networks, to bid for the user's requested communications service. The Analysis Module 20 communicates the request 90 for communications service to the data network 54, the Public Switched Telephone Network 56, the GSM cellular network 58, the CDMA cellular network 60, the TDMA cellular network 62, and the GSM/CDMA/TDMA interoperating network 64. As FIG. 9 shows, the multiple networks may also include the I.E.E.E. 802 wireless network 68, the RF wireless network 70, the ISM wireless network 72, the IR wireless network 74, and the another wireless network 76. While FIG. 9 shows the Analysis Module 20 operating within the data network 54, those of ordinary skill in the art will understand that the Analysis Module 20 may operate within any of the multiple communications networks.

Figure 11:
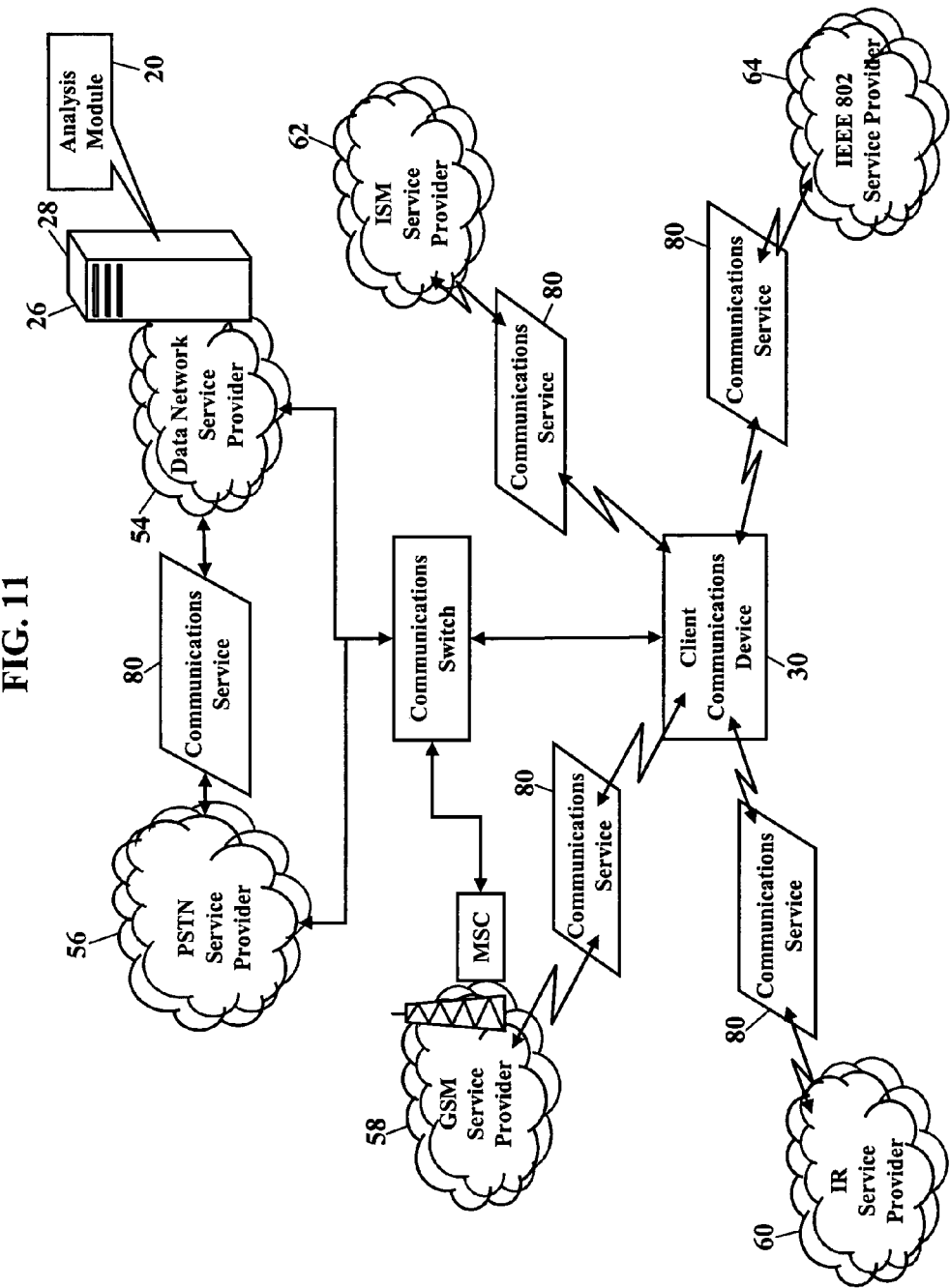

FIGS. 10 & 11 are schematics illustrating the bidding process. Because the user qualified for trust-based credit, the Analysis Module 20 invited other service providers, of other competing communications networks, to bid for the user's requested communications service. If another service provider wishes to bid, the another service provider return communicates the bid 78. Here, however, because Analysis Module 20 negotiates on behalf of the user, FIG. 10 shows the Analysis Module 20 receiving/gathering each submitted bid 78 from the other service providers. The Analysis Module 20 then determines which single bid is preferred, or which combination of bids is preferred. The Analysis Module 20 may consult a set of subscriber-specified rules, a Service Level Agreement, network performance criteria, available network routing/bandwidth, or any other information to determine which single bid, or which combination of bids, is preferred. The individual bids 78 may even be combined by a tier 1 service provider (such as the data network 54 service provider) to fulfill the user's requested communications service. When the Analysis Module 20 settles on the winning bid(s), as FIG. 11 illustrates, the winning bidder(s) provides/provide the requested communications services 80 to the client communications device 30. FIG. 11 illustrates that a combination of differing communications networks won the bidding process and, thus, provides the communications services 80.

Figure 12:
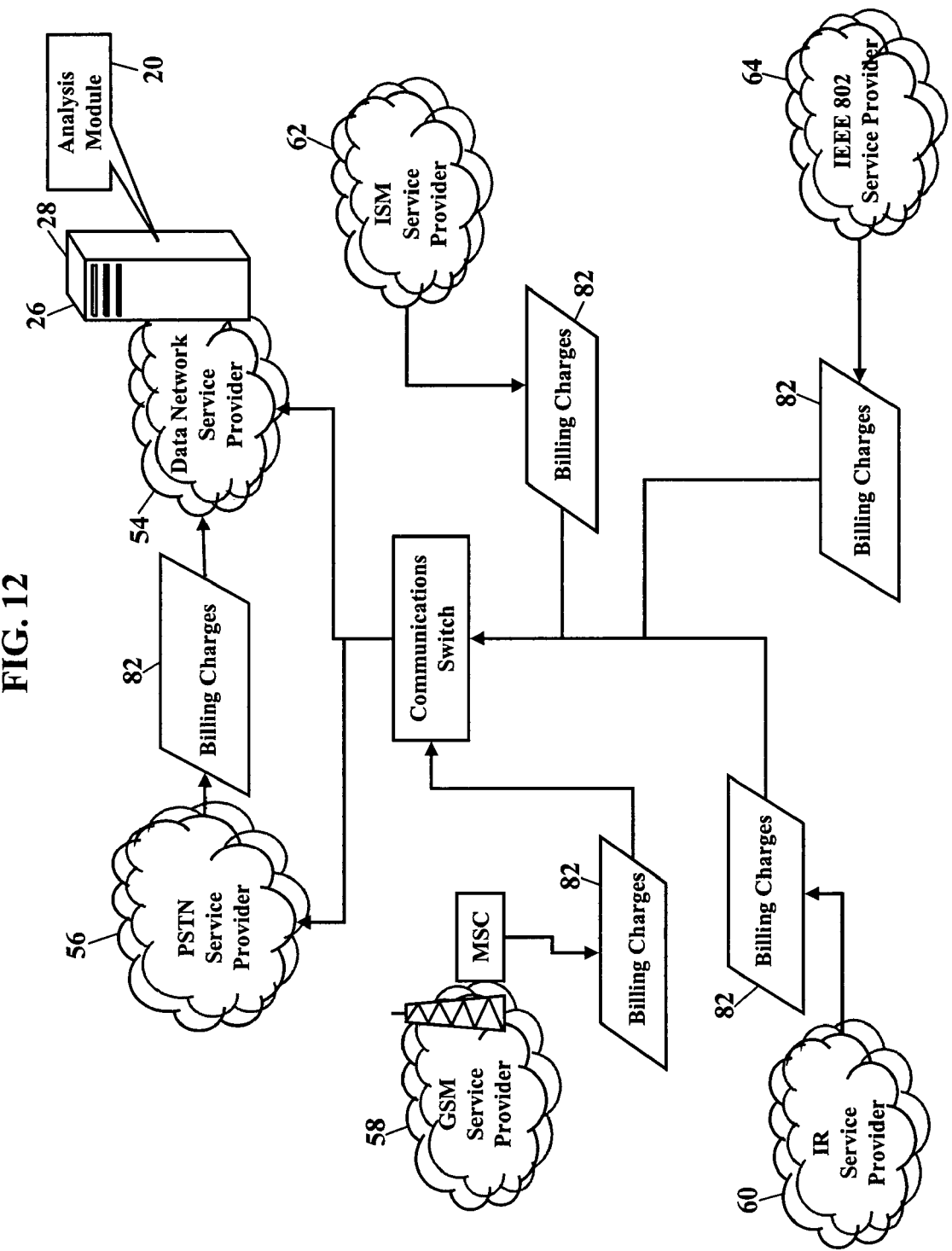

FIG. 12 is a schematic illustrating the billing process. Because trust-based credit was extended to the user, the user is trusted to pay for the communications services (shown as reference numeral 80 in FIG. 11). Although the billing relationships may not be established, the user is permitted receive the communications services. Because the user is "trusted," however, a service provider can establish the necessary billing relationships and then aggregate the total billing charges between the multiple communications networks of the differing service providers, the differing communications networks, and/or the new routing configurations. FIG. 12 thus illustrates one service provider (e.g., the service provider of the data network 54) aggregating the billing charges 82 from other service providers of the other communications networks. Whatever combination of differing communications networks may have won the bidding process, the Analysis Module 20 of this invention aggregates the individual billing charges 82 from the individual service providers of the individual communications networks. Once the individual billing charges 82 are aggregated, the single billing statement may be presented to the user (as FIG. 7 illustrated). Even though multiple communications networks provided the requested communications services (shown as reference numeral 80 in FIG. 11), a single service provider presents the single billing statement to the user. The single billing statement may be mailed to an address associated with the user. The single billing statement may additionally or alternatively be electronically communicated (e.g., emailed) to the user and/or electronically communicated to the client communications device 30. The Analysis Module 20, then, allows a single service provider to act as a "tier 1" provider of communications services and, yet, utilize "tier 2" network operators to provide communications services. The Analysis Module 20 may also process the user's credit card as payment for the communications services (as illustrated and as explained with reference to FIG. 7).

Figure 13:
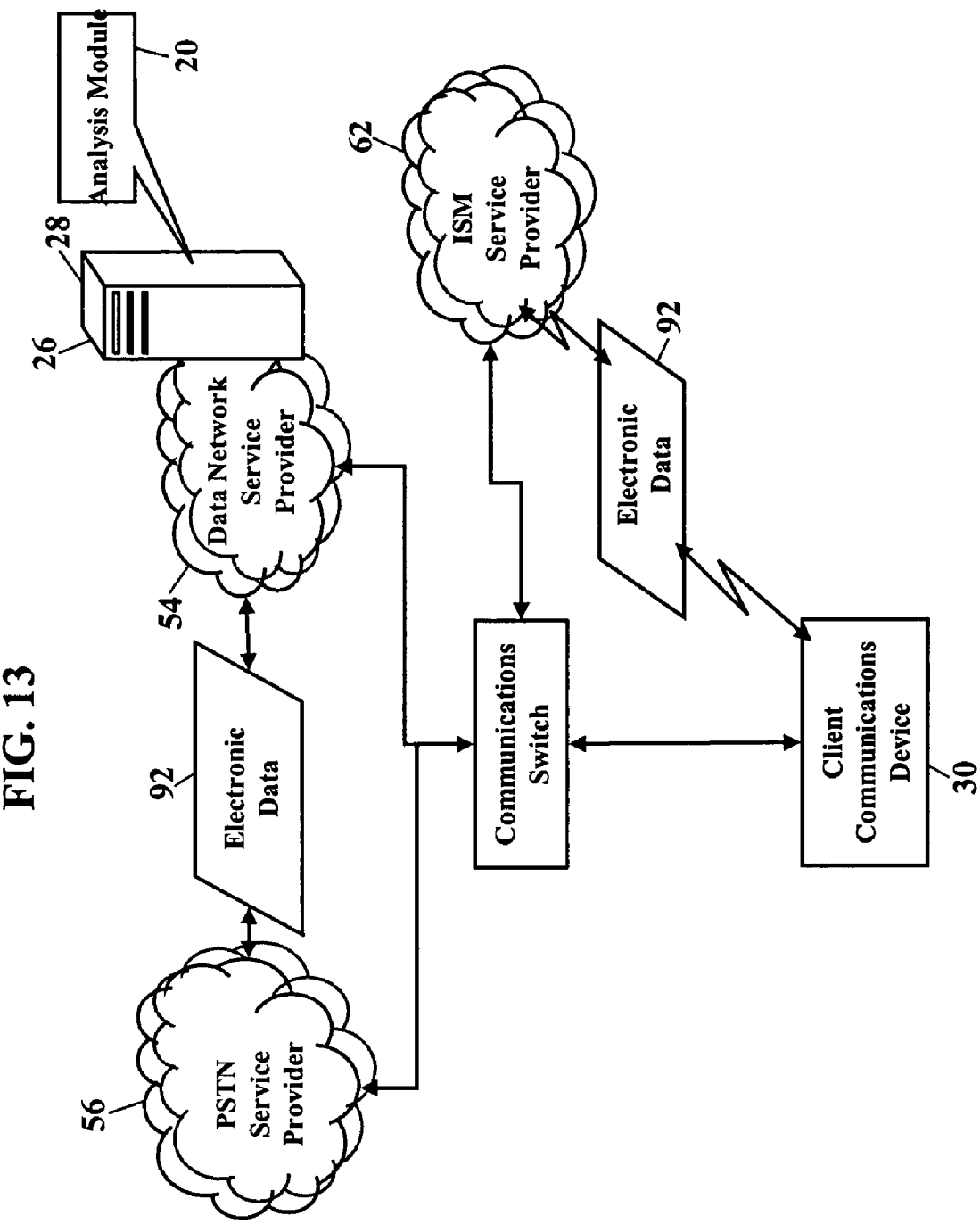
FIGS. 13 and 14 are schematics illustrating the allocation of additional network bandwidth, according to still more embodiments of this invention.
Figure 14:
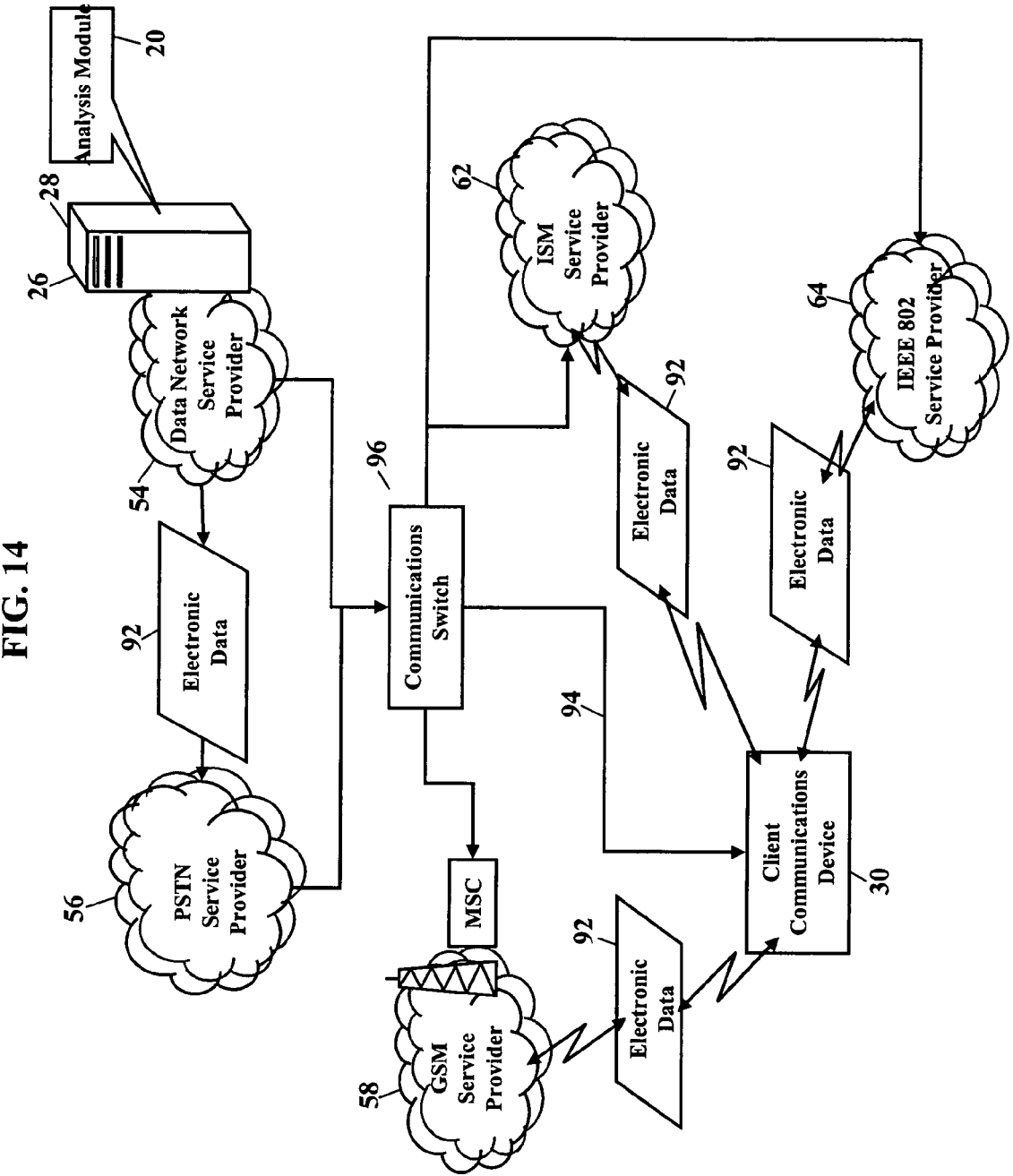

FIGS. 13 and 14 are schematics illustrating the allocation of additional network bandwidth. Sometimes the user of the client communications device 30 requires greater bandwidth than that normally available to the user. The user, for example, may be using the client communications device 30 to download electronic data 92 via the ISM communications network 62. If the user is downloading a large amount of the electronic data 92, such as a digital movie, the data transfer rate of the ISM communications network 62 may not be suitable for the digital movie. That is, the electronic data 92 is transferred too slowly, thus rendering the download uneconomical, unfeasible, or not timely. One solution to slow data transfer rates is to allocate additional bandwidth to the user, thus increasing the data transfer rate to make the download economical, feasible, and timely. If, for example, the user qualifies for trust-based credit, the user is trusted to pay for additional bandwidth, even though billing relationships may not be established. Because the user is "trusted," a service provider can establish the necessary billing relationships, aggregate the total billing charges for the additional bandwidth, and then confidently bill the user for the additional bandwidth.

FIG. 13 illustrates an unfeasible situation. The client communications device 30 is shown downloading the electronic data 92 via the ISM communications network 62. Because the user is downloading a large amount of the electronic data 92 (again, perhaps a digital movie), the data transfer rate of the ISM communications network 62 is not be suitable for the digital movie. When the Analysis Module 20 realizes that the data transfer rate is not suitable for the user's needs, the Analysis Module 20 may extend trust-based credit to the user (as previously explained) and autonomously allocate additional bandwidth to meet the user's needs. As the Analysis Module 20 monitors the communications needs of the client communications device 30, the Analysis Module 20 may consult a set of subscriber-specified rules, a Service Level Agreement, network performance criteria, available network routing/bandwidth, or any other information to determine when the user may require additional bandwidth. If the user requires additional bandwidth, and if the user qualifies for trust-based credit, the Analysis Module 20 may autonomously allocate additional bandwidth from other wireless and/or tertiary communications networks to meet the user's needs.

As FIG. 14 shows, the Analysis Module 20 may allocate additional bandwidth. The Analysis Module 20 may invite other service providers, of other communications networks, to bid for additional bandwidth (as previously explained). The Analysis Module 20 may have established billing/routing arrangements with other communications networks, so the Analysis Module 20 may additionally or alternatively establish additional network routing in order to fulfill the user's communications needs. However the additional bandwidth is established, the allocation of additional network bandwidth based upon the user's payment history, usage history, and credit history. Because the user requires additional bandwidth, and because the user qualifies for trust-based credit, the Analysis Module 20 autonomously allocates additional bandwidth to meet the user's needs. As FIG. 14 shows, the Analysis Module 20 establishes additional wireless routing links with, for example, the GSM communications network 58, and the I.E.E.E. 802 communications network 64. If the client communications device 22 has a wireline connection 94 to a communications switch 96, the Analysis Module 20 may also establish a wireline routing link via either the data network 54 or the Public Switched Telephone Network 56. The term "wireline" means the client communications device 22 sends and receives signals using a physical connection (e.g., wire(s), cable(s), fiber, DSL) to the respective network 54 or 56. The client communications device 30 would include the hardware requirement(s) and/or the software requirement(s) to access, and to communicate with, multiple communications networks (such as the data network 54, the Public Switched Telephone Network 56, the GSM communications network 58, and/or the I.E.E.E. 802 communications network 64). The client communications device 30 may now receive the electronic data 92 at a higher data transfer rate, thus making the download economical, feasible, and timely.

Figure 15:
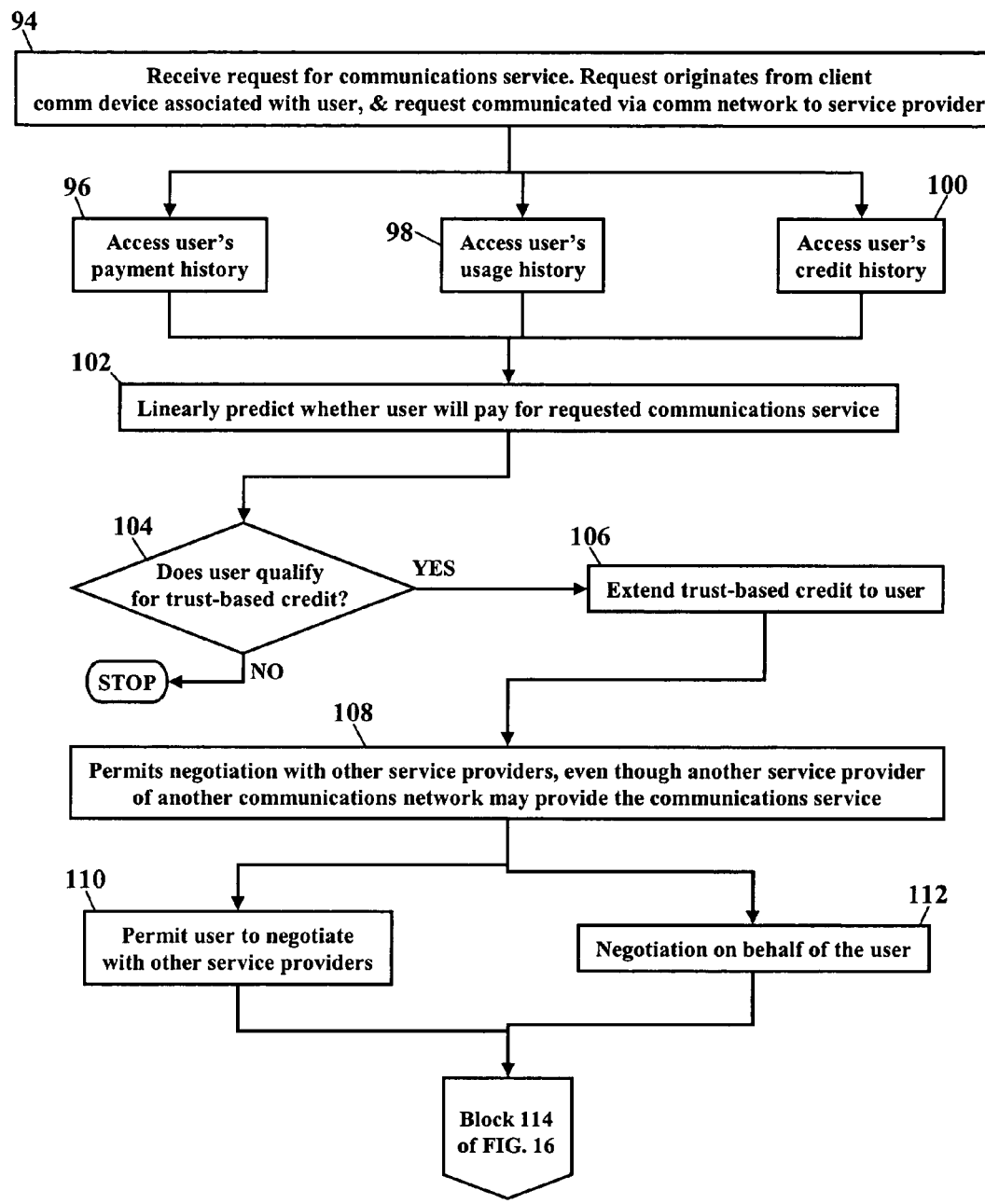
FIGS. 15 and 16 are flowcharts illustrating a method of providing communications service.

FIG. 15 is a flowchart illustrating a method of providing communications services. A request for communications service received (Block 94). The request for communications service originates from a client communications device associated with a user, and the request for communications service is communicated via a communications network to a service provider. The user's payment history (Block 96), usage history (Block 98), and credit history (Block 100) are accessed. The service provider linearly predicts whether the user will pay for the requested communications service (Block 102). If the user qualifies for trust-based credit (Block 104), trust-based credit is extended to the user (Block 106). The service provider permits negotiation with other service providers, even though another service provider of another communications network may provide the communications service (Block 108). The user may be permitted to negotiate with the other service providers (Block 110), and/or negotiations are conducted on behalf of the user (Block 112).

Figure 16:
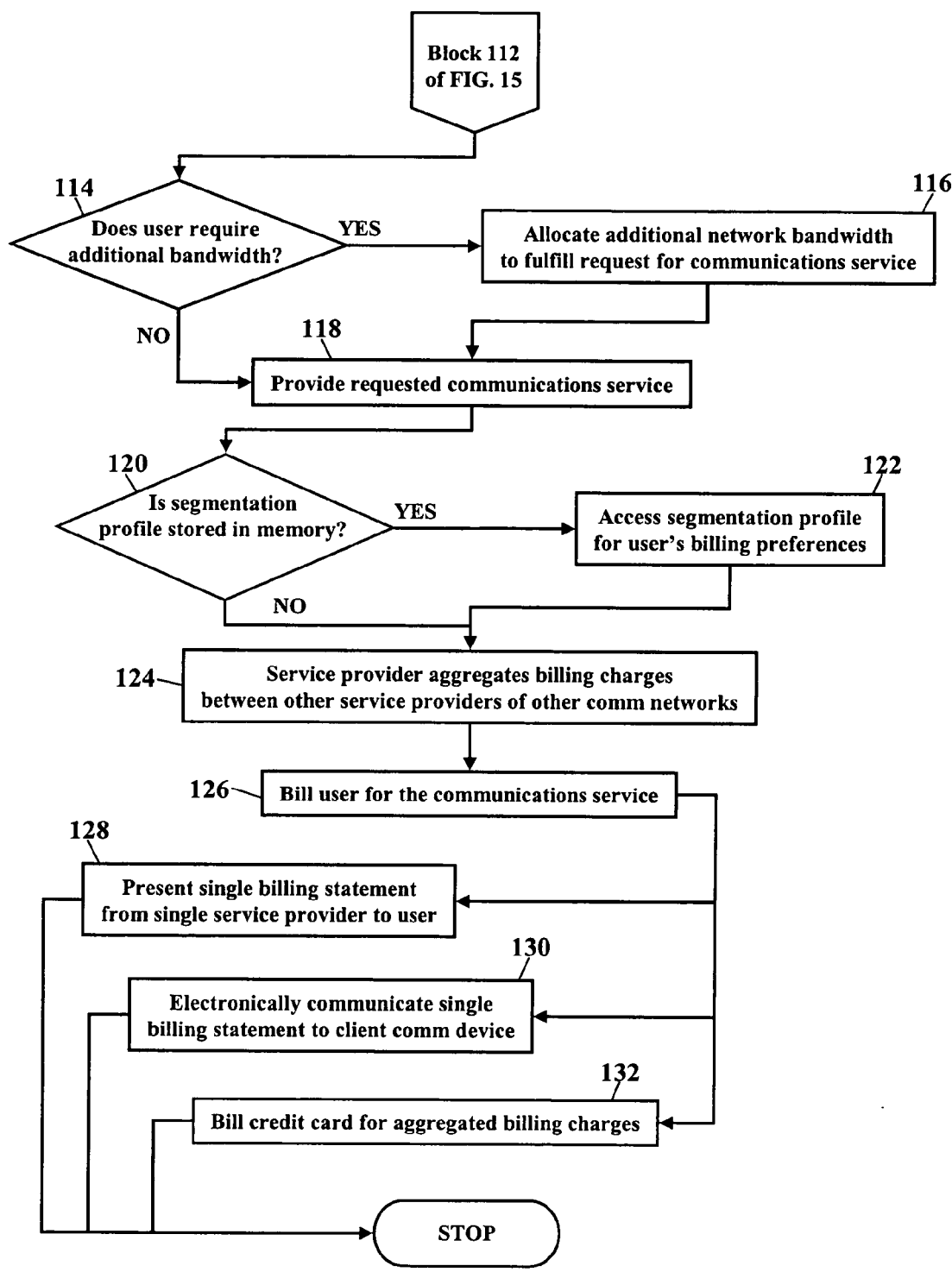

The flowchart continues with FIG. 16. If the user's communications needs require additional bandwidth (Block 114), additional network bandwidth is allocated to fulfill the request for communications service (Block 116). The requested communications service is provided to the user (Block 118). If a segmentation profile is stored in memory (Block 120), the segmentation profile is accessed for the user's billing preferences when presenting billing charges from the other service providers of the other communications networks (Block 122). The service provider aggregates billing charges between the other service providers of the other communications networks (Block 124), and the user is billed for the communications service (Block 126). A single billing statement, from a single service provider, may be presented to the user (Block 128), and the single billing statement aggregates billing charges between the other service providers of the other communications network. The single billing statement may be electronically communicated to the client communications device (Block 130) and/or a credit card may be billed for the aggregated billing charges (Block 132).

The Analysis Module (shown as reference numeral 20 in FIGS. 1-15) may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the present invention, allow the Analysis Module to be easily disseminated. A computer program product for providing communications services includes the Analysis Module stored on the computer-readable medium. The Analysis Module receives a request for communications service. The request for communications service originates from a client communications device associated with a user, and the request for communications service communicates via a communications network to a service provider of that communications network. The Analysis Module then permits the user to negotiate with other service providers of other communications networks to fulfill the request for communications service.

The Analysis Module may also be physically embodied on or in any addressable (e.g., HTTP, I.E.E.E. 802.11, Wireless Application Protocol (WAP)) wireless device capable of presenting an IP address. Examples could include a computer, a wireless personal digital assistant (PDA), an Internet Protocol mobile phone, or a wireless pager.

While the present invention has been described with respect to various features, aspects, and embodiments, those skilled and unskilled in the art will recognize the invention is not so limited. Other variations, modifications, and alternative embodiments may be made without departing from the spirit and scope of the present invention.

What is claimed is:

1. A method of providing communications services, comprising:

receiving a request for communications service at a service provider's server that originates from a user's client device;

linearly predicting by the service provider's server whether the user will pay on-time and in-full for the requested communications service based on a determination whether the user timely paid in-full for previous communications services;

if a determination is made that the user will not pay on-time and in-full for the requested communications service, then declining to fulfill the request for the communications service;

if a determination is made that the user will pay on-time and in-full for the requested communications service, then:

negotiating with other service providers to fulfill the request for communications service;

accessing a segmentation profile containing user preferences for presenting billing charges from the other service providers;

determining a subcontracted processing service is required from a different service provider;

grouping together individual packets of data that require the subcontracted processing service as a new segment;

subcontracting the new segment from the service provider's server to the different service provider to receive the subcontracted processing service; and receiving a subcontracted result of the subcontracted processing service.

2. The method according to claim 1, further comprising extending trust-based credit to the user based upon an algorithm in which the user's historical payment information, the user's historical usage information, and the user's credit card information are variables.

3. The method according to claim 2, wherein extending trust-based credit to the user comprises emphasizing a component of the algorithm with a weighting factor.

4. The method according to claim 1, further comprising extending trust-based credit to the user based upon the user's payment history, the user's usage history, and the user's credit history, wherein the trust-based credit is extended even though another service provider of another communications network may provide the communications service.

5. The method according to claim 1, further comprising billing the user for the communications service.

6. The method according to claim 1, further comprising aggregating billing charges between the other service providers of the other communications networks.

7. The method according to claim 1, further comprising communicating a single billing statement from a single service provider, the single billing statement aggregating billing charges between the other service providers of the other communications networks.

8. The method according to claim 1, further comprising electronically communicating a single billing statement to the client communications device, the single billing statement aggregating billing charges between the other service providers of the other communications networks.

9. The method according to claim 1, further comprising providing the requested communications service.

10. The method according to claim 1, further comprising billing a credit card for the aggregated charges.

11. The method according to claim 1, further comprising allocating additional network bandwidth to fulfill the request for communications service, the allocation of additional network bandwidth based upon the user's payment history and usage history.

12. A computer program product comprising computer readable medium storing processor-executable instructions for performing a method of providing communications services, the method comprising:

receiving a request for communications service at a service provider that originates from a user's client device;

linearly predicting whether the user will pay on-time and in-full for the requested communications service based on a determination whether the user timely paid in-full for previous communications services;

if a determination is made that the user will not pay on-time and in-full for the requested communications service, then declining to fulfill the request for the communications service;

if a determination is made that the user will pay on-time and in-full for the requested communications service, then:

negotiating with other service providers of other communications networks to fulfill the request for communications service;

accessing a segmentation profile containing user preferences for presenting billing charges from the other service providers of the other communications networks;

determining a subcontracted processing service is required from a different service provider;

grouping together individual packets of data that require the subcontracted processing service as a new segment;

subcontracting the new segment to the different service provider to receive the subcontracted processing service; and receiving a subcontracted result of the subcontracted processing service.

13. The computer program product according to claim 12, further comprising code for extending trust-based credit to the user based upon an algorithm in which the user's historical payment information, the user's historical usage information, and the user's credit card information are variables.

14. The computer program product according to claim 12, further comprising code for extending trust-based credit to the user based upon the user's payment history, the user's usage history, and the user's credit history, wherein the trust-based credit is extended even though another service provider of another communications network may provide the communications service.

15. The computer program product according to claim 12, further comprising code for billing the user for the communications service.

16. A machine providing communications services, comprising:

a processor executing code stored in memory, the code causing the processor to:

receive a request for communications service, the request for communications service originating from a user's client device, the request for communications service communicating via a communications network to a service provider;

linearly predict whether the user will pay on-time and in-full for the requested communications service based on a determination whether the user timely paid in-full for previous communications services;

decline to fulfill the request for the communications service when a determination is made that the user will not pay on-time and in-full for the requested communications service;

when the determination is made that the user will pay on-time and in-full for the requested communications service, then:

negotiate, at the user's client device, with other service providers of other communications networks to fulfill the request for communications service;

access a segmentation profile containing user preferences for presenting billing charges from the other service providers of the other communications networks;

determine a subcontracted processing service is required from a different service provider;

group together individual packets of data that require the subcontracted processing service as a new segment;

subcontract the new segment to the different service provider to receive the subcontracted processing service; and receive a subcontracted result of the subcontracted processing service.

17. The machine according to claim 16, wherein the code further causes the processor to aggregate billing charges between the other service providers of the other communications networks.

18. The machine according to claim 16, wherein the code further causes the processor to communicate a single billing statement from a single service provider, the single billing statement aggregating billing charges between the other service providers of the other communications networks.

19. The machine according to claim 16, wherein the code further causes the processor to electronically communicate a single billing statement to the client communications device, the single billing statement aggregating billing charges between the other service providers of the other communications networks.

20. The machine according to claim 16, wherein the code further causes the processor to bill a credit card.

* * * * *